(12) United States Patent
Chang et al.

(10) Patent No.: US 11,445,738 B2
(45) Date of Patent: Sep. 20, 2022

(54) COMPUTER IMPLEMENTED FOOD SAFETY RELATED MANAGEMENT METHOD

(71) Applicant: Sheng-Chih Chang, Kaohsiung (TW)

(72) Inventors: Sheng-Chih Chang, Kaohsiung (TW); Sheng-Nan Chang, Kaohsiung (TW); Jeng-Long Hsieh, Kaohsiung (TW); Chyung Ay, Kaohsiung (TW); Min-Hsiung Pan, Kaohsiung (TW); Shu-Chen Hsu, Kaohsiung (TW); Jui-Che Lin, Kaohsiung (TW); Ping-Jung Hsieh, Kaohsiung (TW)

(73) Assignee: Sheng-Chih Chang, Kaohsiung (TW)

( * ) Notice: Subject to any disclaimer, the term of this patent is extended or adjusted under 35 U.S.C. 154(b) by 620 days.

(21) Appl. No.: 16/566,600

(22) Filed: Sep. 10, 2019

(65) Prior Publication Data

US 2021/0068430 A1   Mar. 11, 2021

(51) Int. Cl.
*A23L 3/00* (2006.01)
*G06F 16/13* (2019.01)
*G06T 7/90* (2017.01)
*H04L 9/40* (2022.01)
*H04L 47/70* (2022.01)
*G06V 10/56* (2022.01)

(52) U.S. Cl.
CPC .............. *A23L 3/003* (2013.01); *G06F 16/13* (2019.01); *G06T 7/90* (2017.01); *G06V 10/56* (2022.01); *H04L 47/824* (2013.01); *H04L 63/08* (2013.01); *G06T 2207/30128* (2013.01)

(58) Field of Classification Search
CPC . A23L 3/003; G06F 16/13; G06T 7/90; G06T 2207/30128; G06V 10/56; H04L 47/824; H04L 63/08; G06Q 50/26; G06Q 30/018
See application file for complete search history.

(56) References Cited

U.S. PATENT DOCUMENTS

| | | | |
|---|---|---|---|
| 8,145,574 B1* | 3/2012 | Hancock | G06Q 50/26 705/308 |
| 2004/0100380 A1* | 5/2004 | Lindsay | G06K 19/0717 340/572.1 |
| 2020/0043156 A1* | 2/2020 | Fox | G06V 40/10 |
| 2020/0265446 A1* | 8/2020 | Vargas | G06Q 10/087 |
| 2021/0035276 A1* | 2/2021 | Ago | G01N 21/9515 |
| 2021/0125142 A1* | 4/2021 | Bloom | G06Q 10/06315 |
| 2022/0170653 A1* | 6/2022 | Green | G05B 15/02 |

\* cited by examiner

*Primary Examiner* — Christopher M Brandt
(74) *Attorney, Agent, or Firm* — Womble Bond Dickinson (US) LLP

(57) ABSTRACT

A food safety related management method includes: allowing a terminal to access an authenticated account; receiving reported data in relation to a defective food product from the terminal; searching a database for piece(s) of highly related data each related to a defective food product and each with a purchase time within a time interval that is defined based on the reported data; searching the piece(s) of highly related data for one(s) with overlapping issues of concern and identical merchant information with the reported data; creating a communication group for communication among accounts used to upload the reported data and said one(s) of the piece(s) of highly related data; and inserting the reported data into the database.

4 Claims, 2 Drawing Sheets

COMPUTER IMPLEMENTED FOOD SAFETY RELATED MANAGEMENT METHOD

FIELD

The disclosure relates to data processing, and more particularly to a computer implemented food safety related management method.

BACKGROUND

For the benefit of the health of the general public, food safety has become an important issue.

Food safety problems are generally discovered via routine spot checks by relevant government agencies or through reports made by the public. However, routine spot checks are low in coverage and efficiency. For example, an act of misconduct of deliberately adding plasticizers into beverage products had been ongoing for three years before being uncovered by the government agency. Therefore, relying solely on routine spot checks proves to be quite inadequate.

While reports made by the public are more immediate than routine spot checks, it is difficult for people involved in individual, independent incidents to join forces, fight against the merchant and obtain reasonable compensation for injuries suffered. As such, there seems to be insufficient incentives for businesses in the food supply chain to raise the level of food safety in the food products.

SUMMARY

Therefore, an object of the disclosure is to provide a food safety related management method.

According to the disclosure, the food safety related management method is to be implemented by a computer system that is operatively associated with a terminal and a database. The database contains multiple pieces of recorded data, each of which was uploaded using an authenticated account, and each of which contains an issue of concern in relation to a defective food product, merchant information of a merchant providing the defective food product, and a purchase time of the defective food product. The food safety related management method includes: (A) allowing the terminal to access an authenticated account; (B) receiving, from the terminal, reported data that contains an issue of concern in relation to a defective food product, merchant information of a merchant providing the defective food product, and a purchase time of the defective food product; (C) defining a time interval based on the purchase time contained in the reported data, and searching the database for one or more pieces of highly related data which is one or more of the pieces of recorded data with the purchase time falling within the time interval; (D) when the search in (C) fails, inserting the reported data into the database to serve as a piece of newly added recorded data; (E) when the search in (C) succeeds, searching the piece(s) of highly related data for one(s) the issue of concern of which overlaps that of the reported data and the merchant information of which is identical to that of the reported data; (F) when the search in (E) succeeds, creating a communication group for communication among the account used to upload the reported data and the account (s) used to upload said one(s) of the piece(s) of highly related data, and inserting the reported data into the database to serve as a piece of newly added recorded data; and (G) when the search in (E) fails, inserting the reported data into the database to serve as a piece of newly added recorded data.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
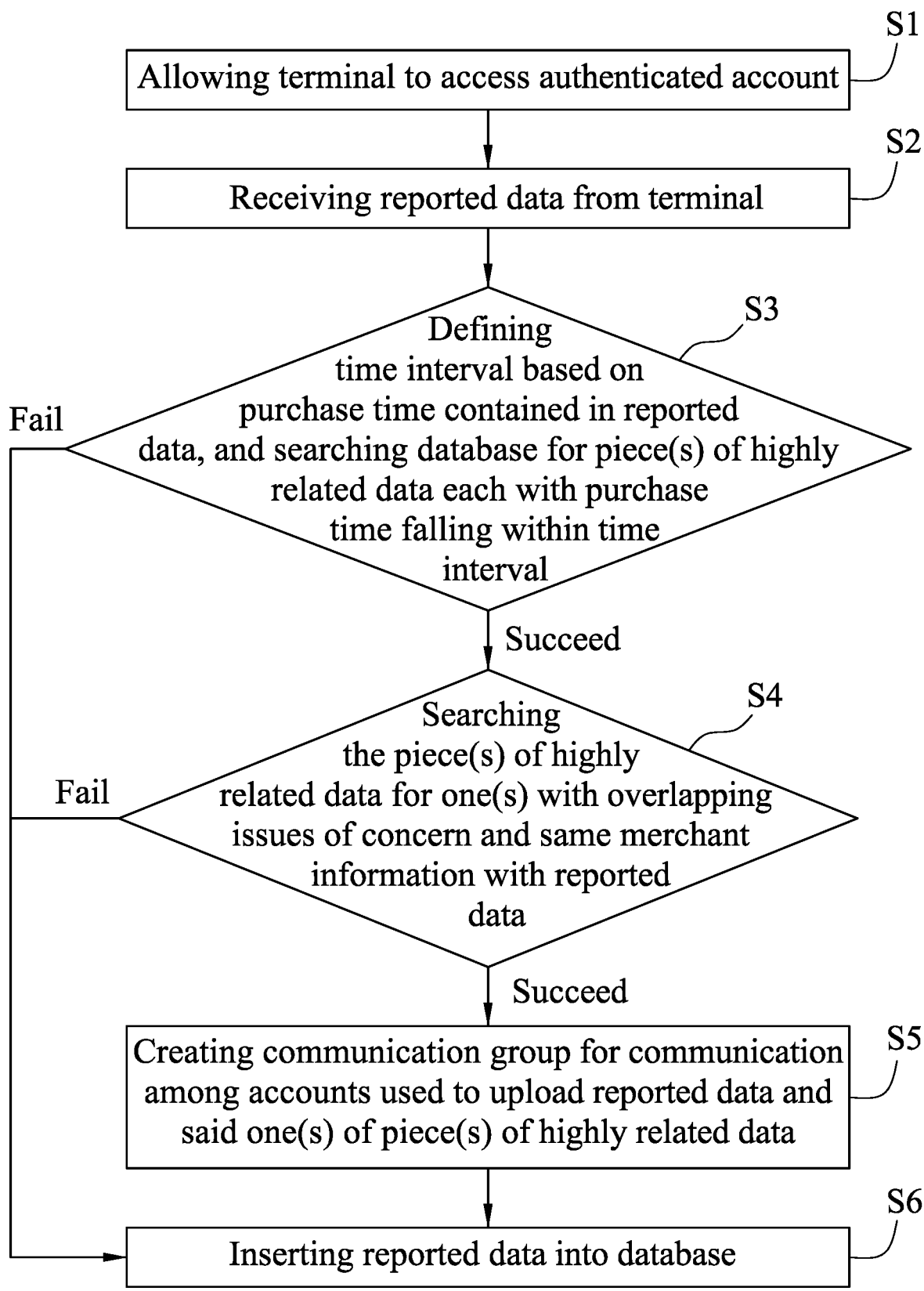
FIG. 1 is a flow chart illustrating an embodiment of a food safety related management method according to the disclosure.
Figure 2:
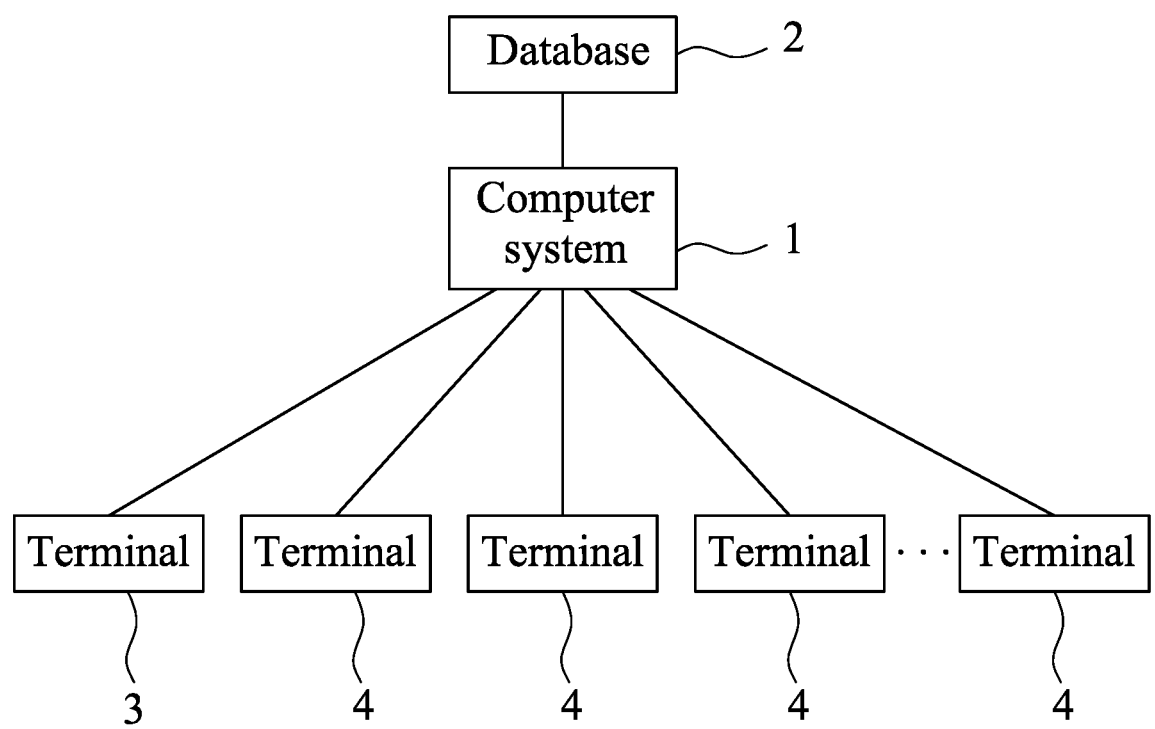
FIG. 2 is a block diagram illustrating a computer system that performs the food safety related management method of the embodiment, and that is operatively associated with a database and one of a plurality of terminals.

Referring to FIGS. 1 and 2, an embodiment of a food safety related management method according to the disclosure is to be implemented by a computer system 1 that is operatively associated with a database 2 and one of a plurality of terminals 3, 4 (e.g., the terminal 3). The database 2 contains multiple pieces of recorded data, each of which was uploaded to the database 2 using an account authenticated by the computer system 1, and each of which contains an issue of concern in relation to a defective food product, merchant information related to a merchant providing the defective food product (e.g., a retailer, a distributor, a manufacturer), and a time of purchase or acquisition (hereinafter referred to as "purchase time") of the defective food product. Each of the terminals 3, 4 is capable of linking to the computer system 1 for communication therewith.

The food safety related management method of this embodiment is performed after the computer system 1 has received login information from the terminal 3 and determined that the received login information matches login information of an account authenticated by the computer system 1. The food safety related management method of this embodiment includes the following steps (S1-S6).

In step (S1), the computer system 1 allows the terminal 3 to access the account.

In step (S2), the computer system 1 receives, from the terminal 3, reported data that contains an issue of concern in relation to a defective food product, merchant information related to a merchant providing the defective food product, and a purchase time of the defective food product. For example, the issue of concern in relation to the defective food product may include a condition suffered by a consumer after consuming the food product, such as diarrhea, vomiting, etc., and/or may indicate a defect of the defective food product, such as containing foreign matter (e.g., a fragment of a dishwashing tool, an insect, etc.). It should be noted that, since the reported data is provided and uploaded to the computer system 1 using the account authenticated by the computer system 1, notification directed to a person using the account is possible when necessary, and an effect of deterring false reports or allegations can also be achieved.

In step (S3), the computer system 1 defines a time interval based on the purchase time contained in the reported data, and searches the database 2 for one or more pieces of highly related data which is one or more of the pieces of recorded data with the purchase time falling within the time interval. If the search fails (i.e., no highly related data is found), the flow goes to step (S6). Otherwise, the flow proceeds to step (S4). It should be noted that the time interval is defined in such a way that the purchase time contained in each piece of highly related data is close to the purchase time contained in the reported data. In addition, the time interval may be defined based further on consumption characteristics in a geographical area where the merchant corresponding to the reported data is located. For example, the time interval is shorter when the merchant is located in an urban area where business is brisk, and is longer when the merchant is located in a rural area where circulation of goods is slow.

In step (S4), the computer system 1 searches the piece(s) of highly related data for one(s) having overlapping issues of concern and identical merchant information with the reported data. Herein, when the issue of concern of one piece of data includes diarrhea and vomiting, while the issue of concern of another piece of data includes only vomiting, or includes vomiting and fever, said two pieces of data are said to have overlapping issues of concern. If the search fails (i.e., none of the highly related data has an issue of concern that overlaps the issue of concern of the reported data and merchant information that is identical to the merchant information contained in the reported data), the flow goes to step (S6). Otherwise, according to the database 2, multiple consumers of food products from the same merchant have encountered the same or similar defects in the food products, and the flow proceeds to step (S5).

In step (S5), the computer system 1 creates a communication group to enable communication among the account used to upload the reported data and the account(s) associated with (used to upload) said one(s) of the piece(s) of highly related data. Therefore, users of these accounts can contact one another, for example, to discuss possible actions to take against the merchant.

In step (S6), the computer system 1 inserts the reported data into the database 2 to serve as a piece of newly added recorded data. Therefore, the volume of the recorded data contained in the database 2 increases with increasing number of use of the food safety related management method of this embodiment.

It should be noted that in step (S5), the computer system 1 may further transmit a warning message to a communication device of at least one of a government agency responsible for food safety or the merchant corresponding to the reported data (i.e., either the government agency or the merchant, or both). With this measure in place, the government agency can immediately react by, for example, inspecting the merchant's workplace, testing the merchant's food products, collecting evidence of misconduct, etc., or the merchant can recall relevant, possibly defective food products as soon as possible, so as to prevent further damage, etc.

In addition, in step (S5), the computer system 1 may further transmit a notification message to at least one pre-selected account. For example, the at least one pre-selected account may be pre-selected by a manager of the computer system 1, and each pre-selected account may belong to a senior or paid member of the computer system 1, so that he/she is promptly advised of allegedly unsafe food products.

Moreover, the reported data may further include at least one photograph of the defective food product and a description of the defective food product that provide details of the defective food product and that may be recorded and retrieved to serve as evidence in future litigations, if any.

In view of the above, since the food safety related management method of this embodiment can gather reports from the public and can create a communication group for consumers with similar issues to contact one another, it creates a platform that can elevate responsiveness to food safety issues and assist in gathering strength of consumers having encountered the same defective food product if the defect appears not to be an isolated event.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that the disclosure is not limited to the disclosed embodiment but is intended to cover various arrangements included within the spirit and scope of the broadest interpretation so as to encompass all such modifications and equivalent arrangements.

What is claimed is:

1. A food safety related management method to be implemented by a computer system that is operatively associated with a terminal and a database, the database containing multiple pieces of recorded data, each of which was uploaded using an authenticated account, and each of which contains an issue of concern in relation to a defective food product, merchant information of a merchant providing the defective food product, and a purchase time of the defective food product, said food safety related management method comprising:
   (A) allowing the terminal to access an authenticated account;
   (B) receiving, from the terminal, reported data that contains an issue of concern in relation to a defective food product, merchant information of a merchant providing the defective food product, and a purchase time of the defective food product;
   (C) defining a time interval based on the purchase time contained in the reported data, and searching the database for one or more pieces of highly related data which is one or more pieces of the recorded data with the purchase time falling within the time interval;
   (D) when the search in (C) fails, inserting the reported data into the database to serve as a piece of newly added recorded data;
   (E) when the search in (C) succeeds, searching the piece(s) of highly related data for one(s) the issue of concern of which overlaps that of the reported data and the merchant information of which is identical to that of the reported data;
   (F) when the search in (E) succeeds, creating a communication group for communication among the account used to upload the reported data and the account(s) used to upload said one(s) of the piece(s) of highly related data, and inserting the reported data into the database to serve as a piece of newly added recorded data; and
   (G) when the search in (E) fails, inserting the reported data into the database to serve as a piece of newly added recorded data.

2. The food safety related management method of claim 1, wherein in (F), further transmitting a warning message to a communication device of one of a government agency responsible for food safety and the merchant indicated by the merchant information contained in the reported data.

3. The food safety related management method of claim 1, wherein in (F), further transmitting a notification message to at least one pre-selected account.

4. The food safety related management method of claim 1, wherein the reported data further includes at least one photograph of the defective food product and a description of the defective food product.

* * * * *